United States Patent
Jang et al.

(10) Patent No.: US 7,103,084 B2
(45) Date of Patent: Sep. 5, 2006

(54) APPARATUS AND METHOD FOR SEARCHING PREAMBLE SIGNAL BASED ON SMALL SEARCH WINDOW

(75) Inventors: Il-Soon Jang, Taejon (KR); Kwang Soon Kim, Taejon (KR); Kyoung Seok Lee, Taejon (KR); Sun Sim Chun, Taejon (KR); Deuk Su Lyu, Taejon (KR)

(73) Assignee: Electronics and Telecommunications Research Institute, Taejon (KR)

( * ) Notice: Subject to any disclaimer, the term of this patent is extended or adjusted under 35 U.S.C. 154(b) by 825 days.

(21) Appl. No.: 10/183,355

(22) Filed: Jun. 28, 2002

(65) Prior Publication Data

US 2003/0118084 A1    Jun. 26, 2003

(30) Foreign Application Priority Data

Dec. 20, 2001   (KR)   ............................. 2001-81908

(51) Int. Cl.
*H04B 15/00*  (2006.01)
*H04K 1/00*   (2006.01)
*H04L 27/30*  (2006.01)

(52) U.S. Cl. .................................... 375/130
(58) Field of Classification Search ........ 375/130–153; 370/209
See application file for complete search history.

(56) References Cited

U.S. PATENT DOCUMENTS

| | | | |
|---|---|---|---|
| 5,305,349 A * | 4/1994 | Dent ........................... 370/209 |
| 5,495,509 A * | 2/1996 | Lundquist et al. .......... 375/367 |
| 5,577,025 A * | 11/1996 | Skinner et al. ............. 370/209 |
| 5,644,591 A | 7/1997 | Sutton |
| 5,781,543 A * | 7/1998 | Ault et al. ................... 370/342 |
| 5,790,589 A * | 8/1998 | Hutchison et al. .......... 375/149 |
| 5,805,648 A | 9/1998 | Sutton |
| 5,914,943 A | 6/1999 | Higuchi et al. |
| 6,009,118 A * | 12/1999 | Tiemann et al. ............ 375/150 |
| 6,028,887 A * | 2/2000 | Harrison et al. ............ 375/147 |
| 6,044,074 A * | 3/2000 | Zehavi et al. ............... 370/350 |
| 6,307,840 B1* | 10/2001 | Wheatley et al. ........... 370/252 |
| 6,466,606 B1* | 10/2002 | Jou ............................. 375/130 |
| 6,480,529 B1* | 11/2002 | Sih et al. ..................... 375/152 |
| 6,731,622 B1* | 5/2004 | Frank et al. ................. 370/342 |
| 6,768,768 B1* | 7/2004 | Rao et al. .................... 375/142 |
| 6,775,319 B1* | 8/2004 | King et al. ................... 375/150 |
| 2002/0094017 A1* | 7/2002 | Wang .......................... 375/144 |
| 2002/0136333 A1* | 9/2002 | Lee ............................. 375/343 |
| 2004/0264554 A1* | 12/2004 | Harms et al. ............... 375/147 |

* cited by examiner

*Primary Examiner*—Jean B Corrielus
(74) *Attorney, Agent, or Firm*—Mayer, Brown, Rowe and Maw LLP

(57) ABSTRACT

An apparatus and method of searching a preamble signal in a search window for reducing a chip size of a preamble searcher in a transceiver of a base station is enclosed. By using a plurality of small window preamble searchers searching the preamble signal in a small search window, which is a division of a large search windows of a conventional preamble searcher divided by search start times, the preamble searcher of the entire search window can be implemented and the size of semiconductor chip is reduced by implementing distributing small preamble searcher in a small semiconductor chips.

8 Claims, 3 Drawing Sheets

APPARATUS AND METHOD FOR SEARCHING PREAMBLE SIGNAL BASED ON SMALL SEARCH WINDOW

FIELD OF THE INVENTION

The present invention relates to an apparatus and method for searching a preamble signal of a mobile station in a wireless communication system; and, more particularly, to an apparatus and method for searching a preamble signal of the mobile station, which reduces a chip size of a preamble searcher in a transceiver of a base station and varies search start times of a plurality of small search windows.

DESCRIPTION OF RELATED ARTS

Generally, since a round trip delay (RTD) of a preamble signal transmitted from a mobile station is unpredictable, a size of a search window of a conventional preamble searcher has to be larger than that of a search window of a conventional multi-path searcher. Due to the size of the search window of the preamble searcher, there is a limitation to implement the preamble searcher as one semiconductor chip.

FIG. 1 is a diagram illustrating a conventional receiver of a base station in a mobile communication system.

Referring to FIG. 1, the conventional receiver includes an antenna 100, a radio frequency (RF) analog/baseband digital converter 110, a preamble searcher 120, a finger 130 and a processor 140.

The RF analog/baseband digital converter 110 converts a radio frequency analog signal received through antenna 100 to a base-band digital signal. The converted signal and the baseband digital signal is inputted to the preamble searcher 120 and the finger 130. The preamble searcher 120 detects initial signal paths and signatures of mobile stations. The signature is an identification of each mobile station by analyzing a signal received through the antenna 100. The detected information is transmitted to the finger 130 and the processor 140.

The preamble searcher 120 measures an intensity of the signal received through the antenna 100 for the path and signature. The preamble searcher 120 also informs a path having the strongest intensity among detected paths having intensity, which is stronger than a certain level, to the finger 130 and the processor 140.

The finger 130 demodulates a preamble message, which is transmitted followed by the preamble, by using a round trip delay received from the preamble searcher 120.

The processor 140 transmits an acquisition indicator channel (AICH) through a transmitter of the base station to the mobile station by using the signature received from the preamble searcher 120.

As mentioned above, the conventional preamble searcher detects the signal path delays and the signature of the mobile station.

However, the conventional preamble searcher uses a large search window for searching the preamble signal due to the unpredictable round trip delay (RTD) contrary to the multi-path searcher. Due to the large search window of the conventional preamble searcher, it is hard to implement the conventional preamble searcher and the multi-path searcher as one semiconductor chip and a size of the semiconductor chip, in which the conventional preamble searcher and the multi-path searcher are implemented, has to be large.

SUMMARY OF THE INVENTION

It is, therefore, an object of the present invention to provide an apparatus and method for searching a preamble signal based on small search windows, which is a division of a large entire search window, for gaining an initial synchronization of the entire search window.

In accordance with an aspect of the present invention, there is provided a small window preamble searcher for searching a preamble signal of a mobile station in a small search window, including: engine start point control unit for generating and controlling a search start point in the small search window; a plurality of spreading code generation unit each for generating a spreading code at the search start point transmitted from the engine start point control unit; a plurality of accumulation unit each for despreading the spreading code generated from the spreading code generation unit and a received signal inputted in a certain time and for coherently accumulating despreaded spreading code, thereby generating a coherently accumulated signal; unit symbol storing unit for storing the coherently accumulated signal; conversion unit for consecutively converting the accumulated signal from the unit symbol storing unit, thereby generating a converted signal; and path arranging unit for non-coherently accumulating the converted signal from the conversion unit and arranging accumulated results.

In accordance with an aspect of the present invention, there is also provided a method for searching a preamble signal in a small window preamble searcher, including the steps of: a) transmitting a search start point in the small search window, which represents an accumulation start time of an engine of the small window preamble searcher is received from the processor, to the engine; b) despreading a spreading code transmitted from a spreading code generator and a received signal from a RF analog/baseband digital converter according to the search start point, accumulating coherently the despreaded spreading code and the received signal during a certain time, and thereby generating a coherently accumulated signal; and c) performing consecutively a hadamard transformation of the coherently accumulated signal, outputting the transformed coherently accumulated signal, accumulating non-coherently the transformed coherently accumulated signal according to a signature, determining a path offset having the strongest energy in each signature and transmitting the path offset having the strongest energy to the processor.

BRIEF DESCRIPTION OF THE DRAWINGS

The above and other objects and features of the present invention will become apparent from the following description of the preferred embodiments given in conjunction with the accompanying drawings, in which.

DETAILED DESCRIPTION OF THE INVENTION

Other objects and aspects of the invention will become apparent from the following description of the embodiments with reference to the accompanying drawings, which is set forth hereinafter.

Figure 1:
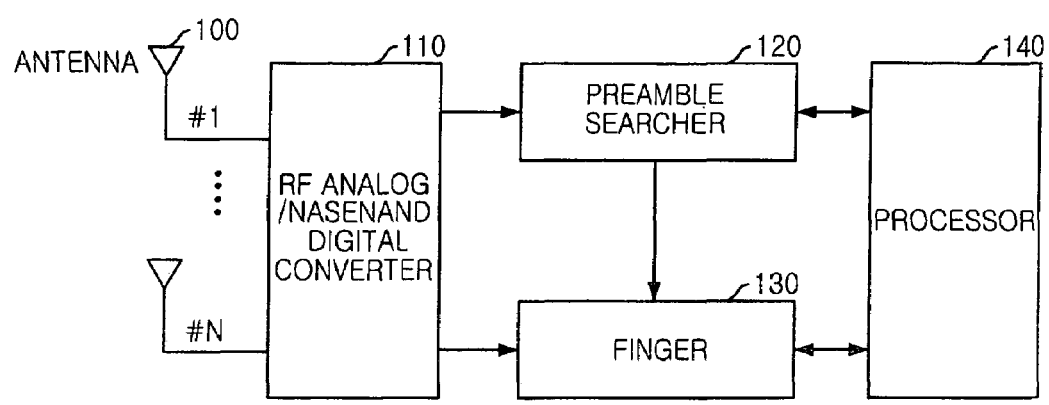
FIG. 1 is a diagram illustrating a conventional receiver of a base station in a mobile communication system.
Figure 2:
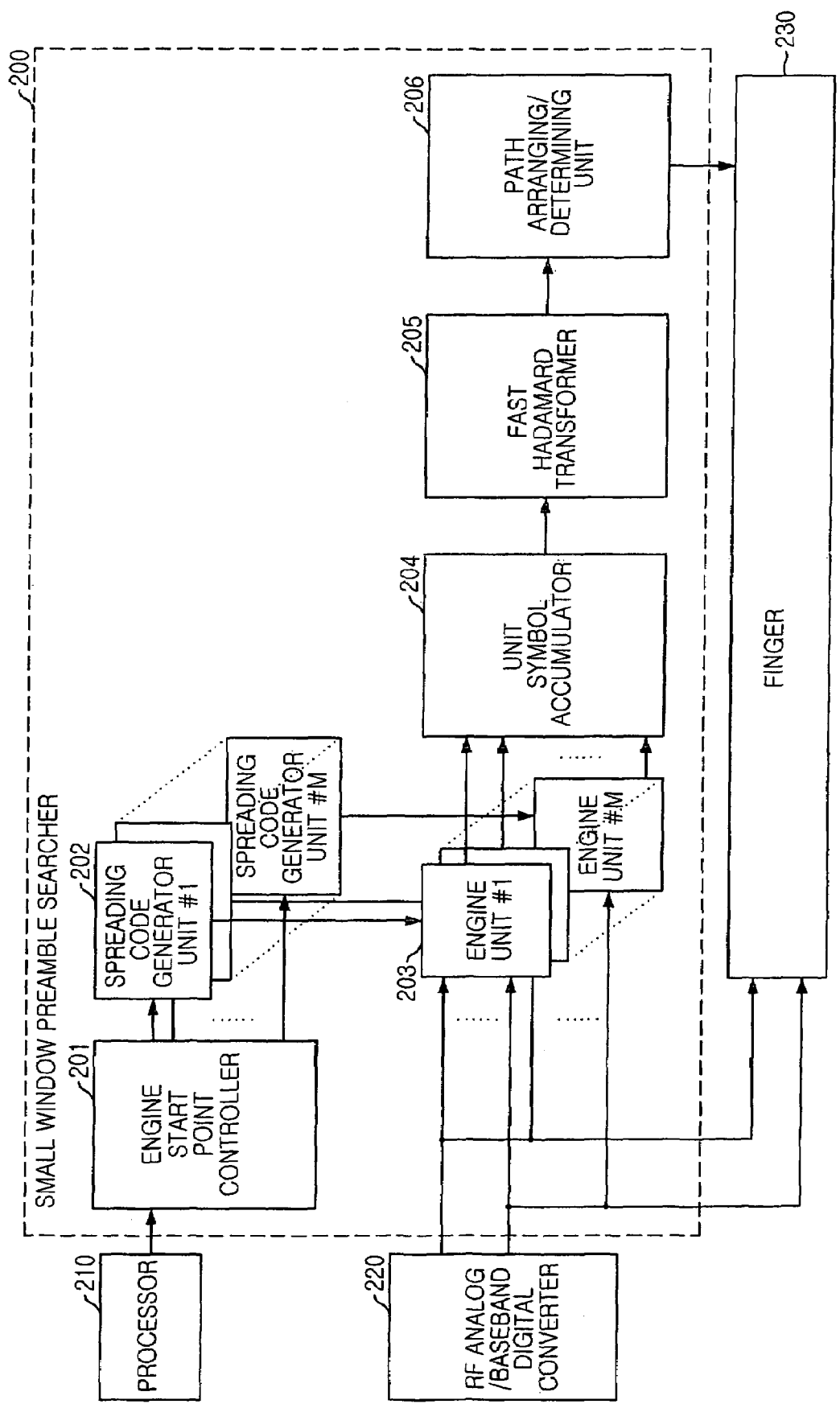
FIG. 2 is a diagram of a small window preamble searcher in accordance with the preferred embodiment of the present invention.

FIG. 2 is a diagram of a small window preamble searcher in accordance with the preferred embodiment of the present invention.

Referring to FIG. 2, the small window preamble searcher includes an engine start point controller 201, a spreading code generator unit 202 composed of a plurality of spreading code generators, an engine unit 203 composed of a plurality of engines, a unit symbol accumulator 204, a fast hadamard transformer 205 and a path arranging/determining unit 206. The preamble searcher is coupled to a processor 210 and a RF analog/baseband digital converter 220.

The engine start point controller 201 generates and controls an operation start point of the small window preamble searcher 200. The spreading code generator unit 202 generates a spreading code from the operation start point received from the engine start point controller 201. The engine unit 203 accumulates coherently the spreading code generated from the spreading code generator unit 202 and received signals during a certain period of time. The unit symbol accumulator 204 stores signals outputted from the engine unit 203. The fast hadamard transformer 205 converts the signals stored in the unit symbol accumulator 204 to a fast hadamard transform (FHT). The path arranging/determining unit 206 non-coherently accumulates signals outputted from the fast hadamard transformer 205 and arranges accumulated results.

Operation steps of the small window preamble searcher of the present invention are explained in detail as follow.

At first, the preamble searcher 200 transmits necessary information to the engine start point controller 201 for searching multi-path inputted from the processor 210 and the RF analog/baseband digital converter 220. The necessary information contains an initial spreading code, a searching start point and a detected threshold value.

The engine start point controller 201 transmits the initial spreading code value received from the processor 210 to the spreading code generator unit 202 and controls a starting point of coherently accumulation of the engine unit 203. The spreading code generator unit 202 generates a spreading code by using the initial spreading code value received from the engine start point controller 201. The generated spreading code is transmitted to the engine unit 203 and the engine unit 203 despreads the received signal from the RF analog/baseband digital converter 220 by using the spreading code.

The engine 203 accumulates the despreaded signal value coherently according to the search start control signal transmitted from the search start point controller 201 and transmits the accumulated value to the unit symbol accumulator 204.

The unit symbol accumulator 204 stores the accumulated value according to the path offset and the signature index temporally. After passing an accumulation time, the unit symbol accumulator 204 transmits the accumulated value to the fast hadamard converter 205.

The fast hadamard converter 205 performs fast hadamard conversion of the accumulated value.

In a meantime, the path arranging/determining unit 206 performs non-coherent accumulation by using the coherently accumulated value. After completing the non-coherent accumulation, the path arranging/determining unit 206 arranges the non-coherent accumulation energy values corresponding to signatures and transmits a path offset having the highest energy to the finger 230.

Figure 3:
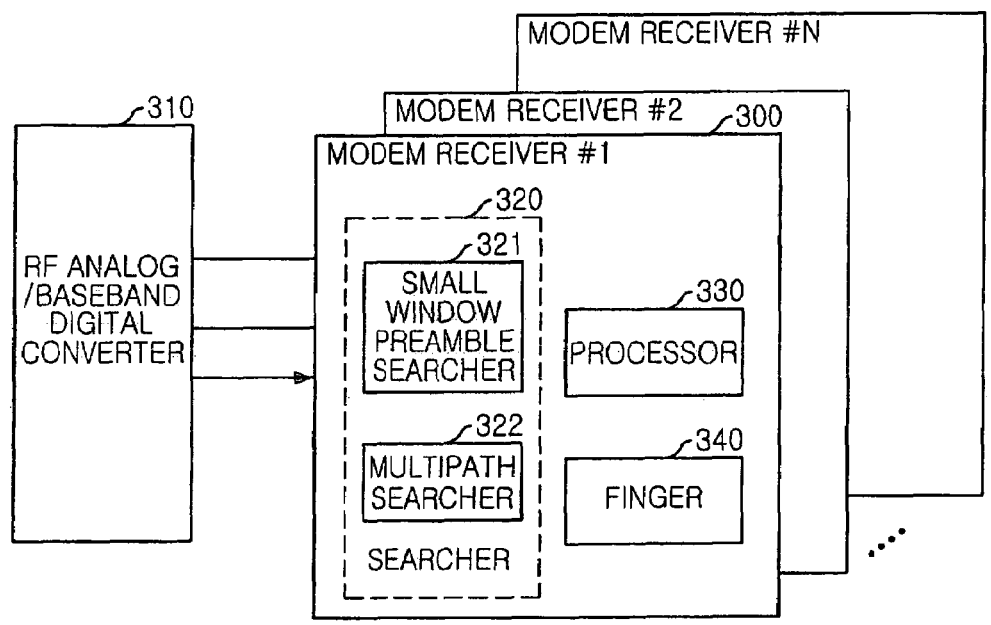
FIG. 3 is a diagram illustrating a preamble searcher of a large search window implemented by a plurality of small window preamble searchers of small search window in accordance with the preferred embodiment of the present invention.

FIG. 3 is a diagram illustrating a preamble searcher of a large search window implemented by a plurality of small window preamble searchers of small search window in accordance with the preferred embodiment of the present invention.

Referring to FIG. 3, a modem receiver unit 300 includes a searcher 320 having a small window preamble searcher 321 and a multi-path searcher 322, a finger 340 and a processor 330. The modem receiver unit 300 is connected to a RF analog/baseband digital converter 310.

Operations of a preamble searcher having above-mentioned configuration are explained in detail as follow.

At first, if we assume that N for a size of window in the small window preamble searcher and M for a size of an entire search window of an preamble searcher, then a number of necessary small window preamble searcher is M/N. Each small window preamble searcher searches a preamble signal in its own small search window. The small search window is a division of an entire search window divided by every search start points. The search start points received from the processor are allocated un-overlapped to the small window preamble searchers. The preamble searcher of the entire search window can be implemented as a plurality of small window preamble searchers of the districted small search windows.

The present invention as mentioned above controls a search start point of small window preamble searchers implemented on multiple channel cards for implementing the preamble searcher of an entire search window by using a plurality of small window preamble searchers.

Therefore a size of a semiconductor chip of the preamble searcher can be reduced by implementing plurality of small window preamble searcher as the preamble searcher of the entire search window.

While the present invention has been described with respect to certain preferred embodiments, it will be apparent to those skilled in the art that various changes and modifications may be made without departing from the scope of the invention as defined in the following claims.

What is claimed is:

1. A small window preamble searcher for searching a preamble signal of a mobile station in a small search window, comprising:
engine start point control means for generating and controlling a search start point in the small search window;
a plurality of spreading code generation means each for generating a spreading code at the search start point transmitted from said engine start point control means;
a plurality of accumulation means each for despreading the spreading code generated from a corresponding one of said plurality of said spreading code generation means and a received signal inputted in a certain time and for coherently accumulating despreaded received signal, thereby generating a coherently accumulated signal at an output of each of said plurality of accumulation means;
unit symbol storing means for storing the coherently accumulated signals;
conversion means for consecutively converting the accumulated signals from said unit symbol storing means, thereby generating converted signals; and
path arranging means for non-coherently accumulating the converted signals from said conversion means and arranging accumulated results.

2. The small window preamble searcher as recited in claim 1, wherein said engine start point control means transmits an initial spreading code value from a processor to said plurality of spreading code generation means and controls the starting point of a coherent accumulation operation based on the search start point.

3. The small window preamble searcher as recited in claim 2, wherein each of said plurality of said spreading code generation means generates the spreading code by using the initial spreading code value transmitted from said engine start control means.

4. The small window preamble searcher as recited in claim 1, wherein each of said plurality of said accumulation means despreads a spreading code from said the corresponding one of said plurality of said spreading code generation means and the received signal from a radio frequency (RF) analog/baseband digital converter and coherently accumulates the despreaded spreading code and the despread received signal in certain time at the output of each of said plurality of accumulation means.

5. The small window preamble searcher as recited in claim 1, wherein said unit symbol storing means for storing the coherently accumulated signal outputted from each of said plurality of said accumulation means according to a signature index.

6. The small window preamble searcher as recited in claim 1, wherein said conversion means temporally stores the coherently accumulated signals transmitted from said unit symbol storing means according to a path offset and a signature index and performs a fast hadamard transformation of the coherently accumulated signals after accumulation.

7. The small window preamble searcher as recited in claim 1, wherein said path arranging means non-coherently accumulates the converted coherently accumulated signals outputted from said conversion means, determines a path offset having the strongest energy in each signature index and transmits the determined path offset to a finger.

8. A method for searching a preamble signal in a small window preamble searcher, comprising the steps of:

a) transmitting a search start point in the small search window, which represents an accumulation start time of an engine of the small window preamble searcher received from a processor, to the engine;

b) despreading a respective spreading code transmitted from spreading code generators and a received signal from a respective one of a plurality of RF analog/baseband digital converter according to the search start point to generated respective despreaded received signals, accumulating coherently each despreaded received signal, respectively during a certain time, and thereby generating a plurality of coherently accumulated signals; and c) performing consecutively a hadamard transformation of the coherently accumulated signals, outputting transformed coherently accumulated signals, accumulating non-coherently the transformed coherently accumulated signals according to a signature index, determining a path offset having the strongest energy in each signature and transmitting the path offset having the strongest energy to a finger.

* * * * *